United States Patent [19]

Bjordal et al.

[11] Patent Number: 5,158,838
[45] Date of Patent: Oct. 27, 1992

[54] METHOD FOR PREVENTING FORMATION OF CALCAREOUS DEPOSITS ON SEAWATER BATTERY CATHODES

[76] Inventors: Oddvar Bjordal, Skaugsv. 41, N-1911 Flateby; Arne H. Hansen, Brentåsveien 34, N-3200 Sandefjord; Øistein Hasvold, Haråsveien 1b, N-0283 Oslo 2; Roy Johnsen, Ada Arnfinnsens vei 5A, N-7000 Trondheim; Per Solheim, Pinaveien 6B, N-3200 Sandfjord; Nils J. Størkersen, Lensmann J. Sorums vei 3, 2020 Skedsmokorset; Sverre Øen, Spireaveien 15E, N-0580 Oslo 5, all of Norway

[21] Appl. No.: 788,526
[22] Filed: Nov. 6, 1991

Related U.S. Application Data

[63] Continuation-in-part of PCT/NO90/00045, Mar. 6, 1990.

[30] Foreign Application Priority Data

Mar. 6, 1989 [NO] Norway ............................ 890929

[51] Int. Cl.$^5$ ............................................. H01M 6/50
[52] U.S. Cl. .................................... 429/50; 429/61; 429/90; 429/119
[58] Field of Search ............... 429/49, 50, 51, 61, 429/90, 119, 220, 224, 218, 245, 209

[56] References Cited

U.S. PATENT DOCUMENTS

| | | | |
|---|---|---|---|
| 3,012,087 | 12/1961 | Van Billiard et al. | 136/160 |
| 3,470,032 | 9/1969 | Egan | 136/160 |
| 3,542,598 | 11/1970 | White et al. | 136/100 |
| 3,607,428 | 9/1971 | Marzolf | 136/100 |
| 3,959,023 | 5/1976 | La Garde | 136/160 |

FOREIGN PATENT DOCUMENTS 8911165 11/1989 PCT Int'l Appl.
90/10957 9/1990 PCT Int'l Appl.

*Primary Examiner*—Anthony Skapars

[57] ABSTRACT

The invention relates to a method for preventing or greatly reducing formation of calcareous deposits on an inert electron conducting cathode in a primary cell (1) which is based on reaction between oxygen, water and a metal anode when it is submerged in seawater and connected to a load (2). The problem of deterioration of the cell (1) caused by calcareous depositions on the cell cathode is solved by monitoring the cell voltage and/or criteria leading to changes in the cell voltage and reducing or disconnecting the load (2) if the cell voltage falls below a certain level (VL) and reconnecting the load (2) after a certain time or when the voltage rises above a certain second level (VH).

11 Claims, 2 Drawing Sheets

METHOD FOR PREVENTING FORMATION OF CALCAREOUS DEPOSITS ON SEAWATER BATTERY CATHODES

This application is a continuation-in-part of PCT/NO90/00045, Mar. 6, 1990.

TECHNICAL FIELD

The present invention relates to a method for preventing or greatly reducing formation of calcareous deposits on an inert electron conducting cathode for primary galvanic cells (batteries) which use natural seawater as electrolyte and dissolved oxygen in the seawater as the oxidant.

BACKGROUND ART

Such cells are described for example in International Application No. WO 89/11165 (O. Hasvold 3). The invention relates in particular to a method for use with a seawater cell which is based on the reaction between oxygen, water and a metal anode, when it is submerged in seawater and connected to a load. The anode may be magnesium, aluminum or some other metal or metal alloy which is electro-negative with respect to the cathode.

The principal sources of deterioration for seawater batteries with long lifetimes are (a) anode depletion, (b) biofouling, and (c) development of a calcareous layer on the cathode. Anode depletion is obviously the factor which ideally should limit the life of the cell. Biofouling is dependent on season, water depth and the presence of sufficient nutrients in the seawater. In absence of light, and in only moderately polluted water, biofouling is not a problem over a time period of years.

The third source of deterioration (c) has, however, proved to cause the greatest problems. The object of this invention is therefore to reduce the rate of formation of a calcareous deposit on the cathode and substantially increase the lifetime of such seawater cells. To achieve this object we have found a method with involves measuring various cell parameters during cell operation and under varying load conditions according to certain criteria which will be clarified in the following. p Electrical circuits which supervise seawater batteries are known. In U.S. Pat. No. 3,470,032 there is shown a circuit where the detected voltage is used to control the water flow through the battery. In U.S. Pat. No. 3,012,087 and 3,542,598 there are suggested to use the detected battery voltage to vary the inlet of fresh seawater relatively to the recirculated water volume, whereby also the water temperature and the salt content are controlled. In the mentioned U.S. Pat. No. 3,012,087 there is also suggested that the battery voltage can be controlled by varying the water flow or by varying the water temperature by means of a heat exchanger.

In the mentioned publications, in particular the last mentioned, the load vary freely, while the voltage is maintained constant by varying different factors as e.g. the flow of water. With our seawater cells it is not practical to vary these parameters.

To use a control valve as mentioned in U.S. Pat. No. 3,470,032 to control in oxygen based seawater battery will be meaningless because too high water flow will not harm the battery, and no valve is better than an open valve. The same conclusion can be drawn with regard to U.S. Pat. No. 3,012,087. The circuit can of course activate a pump or propeller, but as previously mentioned the water requirement is so large that the natural convection caused by ocean currents is preferable, because a considerable part of the battery output would be used to pump water. Furthermore the reliability of such a battery will be reduced compared to a battery with no movable parts.

In U.S. Pat. No. 3,607,428 the water level within a battery compartment is varied by means of a valve in dependence of the battery voltage. The water flow requirements leads to the conclusion that the principles of U.S. Pat. No. 3,607,428 cannot be used for seawater batteries based on dissolved oxygen.

The control systems mentioned in the above patents are not considered suitable for eliminating or greatly reducing formation of calcareous deposits on the cathodes.

In DE OS 3 417 481 is described a battery connection where the load is disconnected when the battery voltage falls below a certain value. In UK Pat. No. 1 155 263 is described a battery connection for a truck where the battery can only be connected to a small load (driving) when the battery voltage falls below a certain value, while a larger load (lifting) is prevented.

Both these publications describe electrical circuits which reduces the load on accumulators, i e rechargeable (secondary) batteries, if the accumulator voltage becomes lower than a certain value. The reasoning for using such circuits in these two cases, is to secure the accumulators and contactors of the trucks, respectively, against overload and damage and to prevent fire. The damage referred to by overloading the accumulators, i e deep discharge, would be a reduction of the maximum number of obtainable cycles, i e the maximum number of charging and discharging cycles that an accumulator could normally take. It is well known that deep discharge reduces the lifetime of lead acid accumulators.

Primary batteries with which the present invention is concerned cannot be electrically recharged as the accumulators dealt with in the mentioned DE and UK patent specifications. In primary batteries there are other processes and parameters than cycling which in principle determine the life of the battery, namely the amount of active material (anode and cathode material) present in the battery and the obtainable rate of consumption of active material. It will normally be meaningless to use the mentioned circuit with primary batteries.

The present invention relates to seawater batteries which are primary batteries, the life of which in principle is determined by the amount of anode material available. The oxidant, (oxygen dissolved in seawater) flows freely through the battery and is reduced electrochemically at the battery cathode. The amount of oxidant available does not limit the lifetime directly.

In U.S. Pat. No. 3,959,023 there is described a power supply comprising a seawater battery of the magnesium silver chloride type. With such batteries there is formed a certain amount of sediments or slurry which after a certain time impairs the operation of the battery. The battery is connected to a light and/or a heavy load. A hydraulic pump is arranged in connection with the battery in order to pump the seawater electrolyte through the battery when it is heavily loaded.

A seawater cell based on oxygen dissolved in seawater requires a flow of seawater which is some 30,000 times larger than required for a silver chloride battery. This is the reason why seawater batteries based on naturally available dissolved oxygen is used for power sources where the power output is low and the discharging time is long, in order of months and years, while silver chloride batteries are used in systems (torpedoes, sonar buoys, emergency lights) requiring high power output for a short time. Due to the high rate of water exchange required, the batteries must have an open structure making series connection of cells in these batteries rather difficult, whereas series connections are common for silver chloride batteries.

Under normal seawater cell operation, i.e. when loading a cell, oxygen is reduced at the cathode according to the reaction:

$$O_2 + 2 H_2O + 4e^- = 4 OH^- \quad (1)$$

This galvanic reaction consumes electrons, oxygen and water and produces hydroxyl ions which lead to an increase in the pH at the surface of the cathode: This alkalization of the seawater at the cathode surface can lead to a precipitation of a calcareous deposit of magnesium and calcium hydroxides and carbonates from calcium and magnesium salts dissolved in the seawater according to:

$$Mg^{++} + 2 OH^- = Mg(OH)_2 \quad (2)$$

and $$Ca^{++} + HCO_3^- + OH^- = CaCO_3 \quad (3)$$

This formation of a calcareous layer is well known and considered beneficial in connection with cathodic protection of metal structures in seawater as it reduces the current necessary to protect the structure. Once formed, these slightly soluble salts do not easily redissolve. This effect is accordingly detrimental to seawater cell cathodes.

The rate of $OH^-$ production on the surface increases with the current density according to reaction (1). This leads to an increase in pH at the cathode surface. There will be a diffusion layer around the cathode and the increase in pH at the surface also increases with the thickness of the this layer. For a given cathode geometry, the thickness of the diffusion layer decreases with increasing seawater velocity. Thus either a high current density, resulting in a high rate of formation of hydroxyl ions or a low water velocity resulting in a low rate of transport of hydroxyl ions away from the cathode surface, leads to a pH increase at the cathode surface. This increase in pH is low and limited upward by the low concentrations of oxygen in the seawater. If however the cathode potential is so low that reduction of water to hydrogen:

$$2 H_2O + 2 e^- = H_2 + 2 OH^- \quad (4)$$

takes place simultaneously, there is no such limitation on the upper pH, as the supply of water is nearly unlimited. In this case, the probability of formation of calcareous deposits on the cathode is significantly increased.

DISCLOSURE OF INVENTION

Thus, by disconnecting or reducing the load as soon as the cell voltage goes below a certain limit, which depend on the catalytic activity of the cathode with respect to reaction (1), the alkalization of the cathode and thus the formation of a calcareous layer, should be reduced to a large extent. The electric control device should introduce sufficient control so that the system do not load or fully load the cell before new fresh seawater has entered the cell. The internal resistance of a 6 Ampere·Year cell is typically between 0.05 and 0.1 ohm with a typical load of 2-3 A. The difference between the first and second voltage level should be larger than the voltage drop due to the internal resistance of the cell.

Alternatively to switching on the load again at a certain second voltage level, the electric control device may be designed in such a manner that the cell remain off for a fixed amount of time, for instance one minute, to allow fresh seawater to reenter the cell, before the load is applied again. This can be done with a timing device.

The rate of an electrochemical reaction usually increases with the difference between the cathode potential and the equilibrium potential (Nernst potential) of the reaction. For reaction (1) or (4) to proceed as written, the cathode potential must be less than the equilibrium potential. The rate of reaction depends on the catalytic properties of the cathode and the deviation from the equilibrium potential. Until the rate (i.e. current) is limited by the rate of supply of the reactant to the cathode surface (as may be the case with oxygen in seawater) — the current will increase with decreasing cathode potential. According to K. J. Vetter: "Electrochemical Kinetics", Academic Press, New York, 1967, the Nernst potential for reaction (1) is given by:

$$E_N = 1.23\ V - (RT/4F) \cdot \ln(((OH^-)^4)/(O_2)) \quad (5)$$

which for air saturated seawater transforms into $$E_N = 1.23\ V - 0.059\ V \cdot pH + 0.016\ V \cdot \log(O_2) \quad (6)$$

In air saturated seawater with a pH of 8.2, the Nernst potential is $+0.746$ V (0.746 $V_{nhe}$) versus a normal hydrogen electrode or 0.50 V (0.50 $V_{sce}$) versus a saturated calomel electrode. Correspondingly the Nernst potential for the water reduction reaction (4) can be calculated to 31 0.73 $V_{sce}$. So the potential of a cathode in air saturated seawater must be below $+0.5\ V_{sce}$ for the reduction of oxygen and below $-0.73\ V_{sce}$ for the reduction of water to be thermodynamically possible. The Nernst potential for the reduction of oxygen decreases with an increase in pH and with a decrease in oxygen concentration as shown in equation (6).

It is well known that the potential of an oxygen reducing cathode decreases at constant current if:
a) pH is increased
b) oxygen concentration is reduced
c) or electrolyte velocity is reduced, — leading to a) and b) at the surface of the cathode (diffusion overvoltage)

If one assumes that the concentration of oxygen in the bulk of the seawater is constant, variations in the cathode potential reflects variations in the pH at the surface and accordingly the tendency to form calcareous deposits according to equation (3). Under conditions of low electrolyte velocity, the cathode potential will decrease, the pH increase and the rate of formation of calcareous deposits increase.

This means that if the cathode potential falls below a certain critical value, corresponding to an unacceptable rate of formation of calcareous deposit, cathode degradation may occur. This can be prevented by immediately reducing the current density at the cathode. As soon as the cathode potential reaches a value which is consistent with a low rate of formation of calcareous deposits, the current density is increased again to its nominal value.

The cell voltage (corrected for ohmic drop), is the difference between the potential of the cathode and the potential of the anode. As the potentials of anodes made from magnesium, zinc or aluminum is practically unaffected by variations in the seawater velocity and oxygen content, and is only slightly affected by variations in temperature and salinity, variations in the cathode potential at constant load must be reflected in similar variations in the cell voltage.

By disconnecting the cell from the load when the cathode potential falls below a certain value equivalent to that the cell voltage falls below a value VL which is below the normal cell voltage under condition of normal sea currents (typically between 0.2 V and 0.6 V below the open circuit cell voltage (OCV) of the cell in fresh seawater), and reconnecting the load again when the cathode potential rises above a second higher value equivalent to a cell voltage level VH which is close to, but less than the open circuit cell voltage in fresh seawater, it should be possible to avoid or greatly reduce the formation of calcareous layers. Alternatively, the cathode potential can be directly measured with a suitable reference electrode. In the period where the cell is unloaded or operated at a reduced load, the load must be supplied with energy from another source.

An alternative way of reducing the formation of calcareous layers under conditions of low seawater velocity, (ocean current) would be to monitor the ocean current and disconnect the seawater cell from the load when current decreases below a set value. A typical value being 2 cm/s, but this value depends on the load as the cell can tolerate lowered seawater velocity as the cathode current density is decreased. As it is easier to measure cell voltage or cathode potentials than seawater velocity, the first alternatives are preferred.

BRIEF DESCRIPTION OF THE DRAWINGS

Above mentioned and other features and objects of the present invention will clearly appear from the following detailed description of embodiments of the invention taken in conjunction with the drawings, where FIG. 1 schematically illustrates a seawater cell power supply.

BEST MODE FOR CARRYING OUT THE INVENTION

Figure 1:
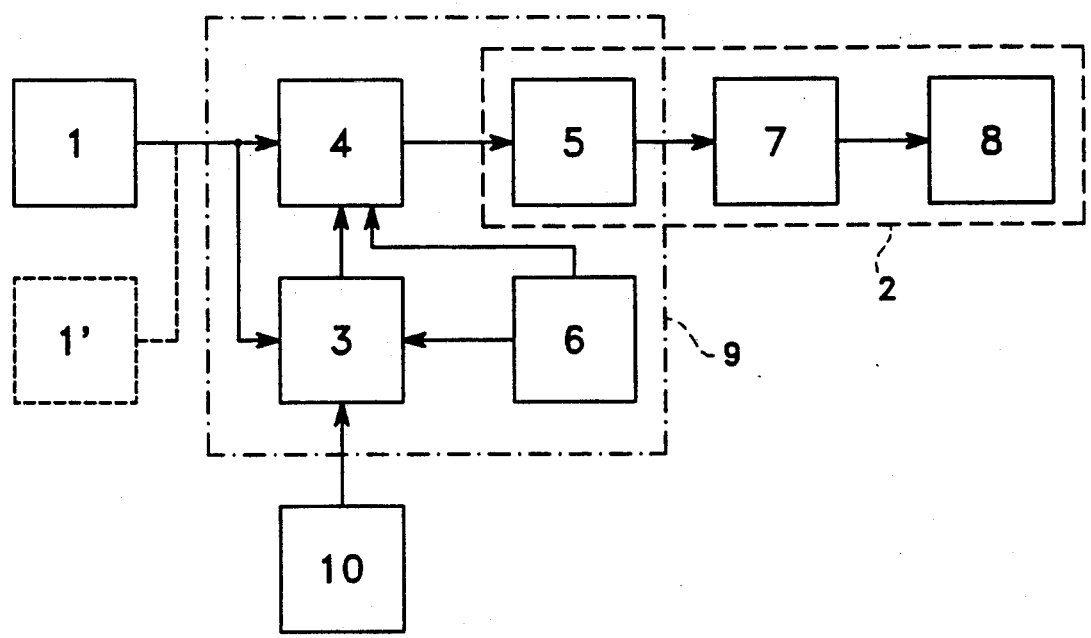

FIG. 1 is a block schematic illustrating how a seawater cell 1 can be connected to a load 2 under control of a monitoring device 3 and a switching device 4. A DC/DC voltage converter 5 loads the seawater battery and is connected to a secondary battery 7 which feeds an external load 8. The converter 5 can be of the type described in U.S. Pat. No. 4,695,935 (S.en 2-1001). The monitoring device 3, the switch 4 and the converter 5 can be included within one housing 9 together with a timing device 6. If the monitor 3 detects a cell voltage lower than a certain level VL, the load is disconnected or reduced until the monitor detects a cell voltage higher than a certain second level VH. Alternatively the monitor may be preset to maintain the load disconnected or reduced for a fixed amount of time, and then reconnect the load. This can be done with the timing device 6. Yet another alternative is to disconnect/reduce and reconnect the load using other criteria, such as unfavorable load conditions and environmental conditions, to trigger these events. Environmental conditions (i.e. ocean current) can be detected with a sensor 10. Several seawater cells 1,1', . . . may be connected in parallel to the monitor 3 and switch 5.

Testing of seawater cells on site and in laboratory setups have shown that if the water flow is too low, the cell voltage falls towards 0.4 volts in cells with magnesium anodes. At this cell voltage, the rate of formation of calcareous deposits is very high. In order to prevent such deposits on the cathode from occurring, we have found that it is necessary to prevent the cathode potential from falling to levels where reduction of water can take place (4). However, also cells where the cathode potential is kept above the Nernst potential for water reduction, may be susceptible to calcareous formation, although at a much lower rate than in cells where water reduction may take place. This occurs especially in cells where the surface concentration of oxygen at the cathode is reduced too much below the bulk value. To minimize the problem, the cathode potential corresponding to the level VL should be chosen as high as the load, the catalytic properties of the cathode and the prevailing sea current can allow. For instance in cells with spinell coated stainless steel cathodes, the load should be disconnected at a cathode potential of $-0.25$ $V_{sce}$. In cells with AZ63 magnesium anodes, the corresponding cell voltage VL is 1.2 V. At this voltage level the load is disconnected or reduced. To give the cell sufficient time to exchange the used seawater at the cathode surface and to prevent the cell from oscillating at 1.2 V, we found that good results were obtained if the cell remained unloaded, wholly or partly, until the cell voltage reached 1.5 V corresponding to a cathode potential of 0.0 $V_{sce}$. This is illustrated in FIG. 2.

Figure 3:
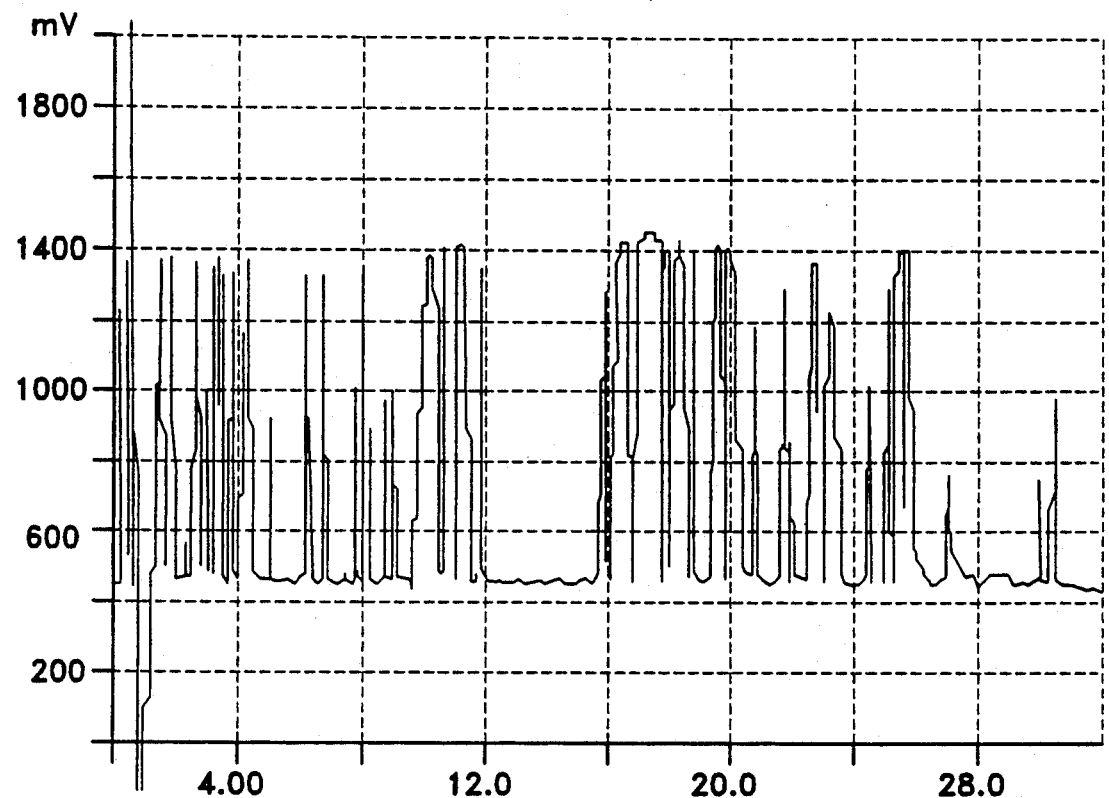
FIGS. 3 and 4 illustrates cell voltage versus time for two different seawater cells.

A practical seawater battery system consists of one or more cells in parallel, a DC/DC converter and a secondary battery which is charged from the DC/DC converter. The DC/DC converter is the load of the seawater battery. This converter charges the secondary battery and the external load is connected to this secondary battery. Unless the secondary battery is totally discharged, power to the external load will not be affected by variations in the output of the DC/DC converter. Given a constant load, and a constant efficiency of the DC/DC converter, the cell current is inversely proportional to the cell voltage. Unless the load is switched off or reduced when the sea current occasionally goes beyond a limit which depends on battery design and load, irreversible deterioration occurs. This is illustrated in the cell voltage versus time diagram shown in FIG. 3. After the test, which was terminated after 4 months, the cell was found to have massive calcareous deposits on its cathode.

Figure 2:
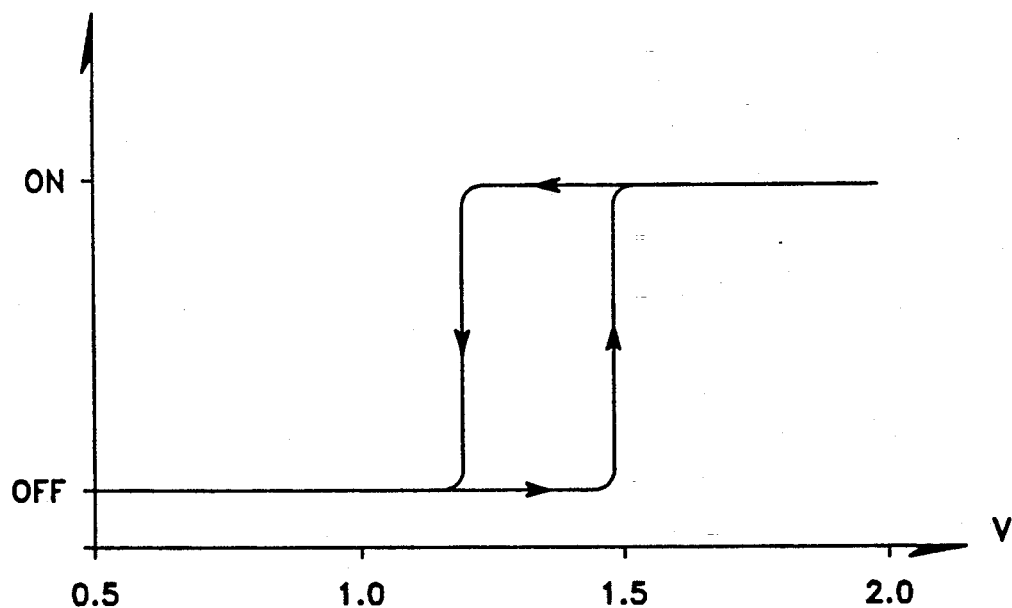
FIG. 2 illustrates the principles for loading a seawater cell in accordance with the invention.
Figure 4:
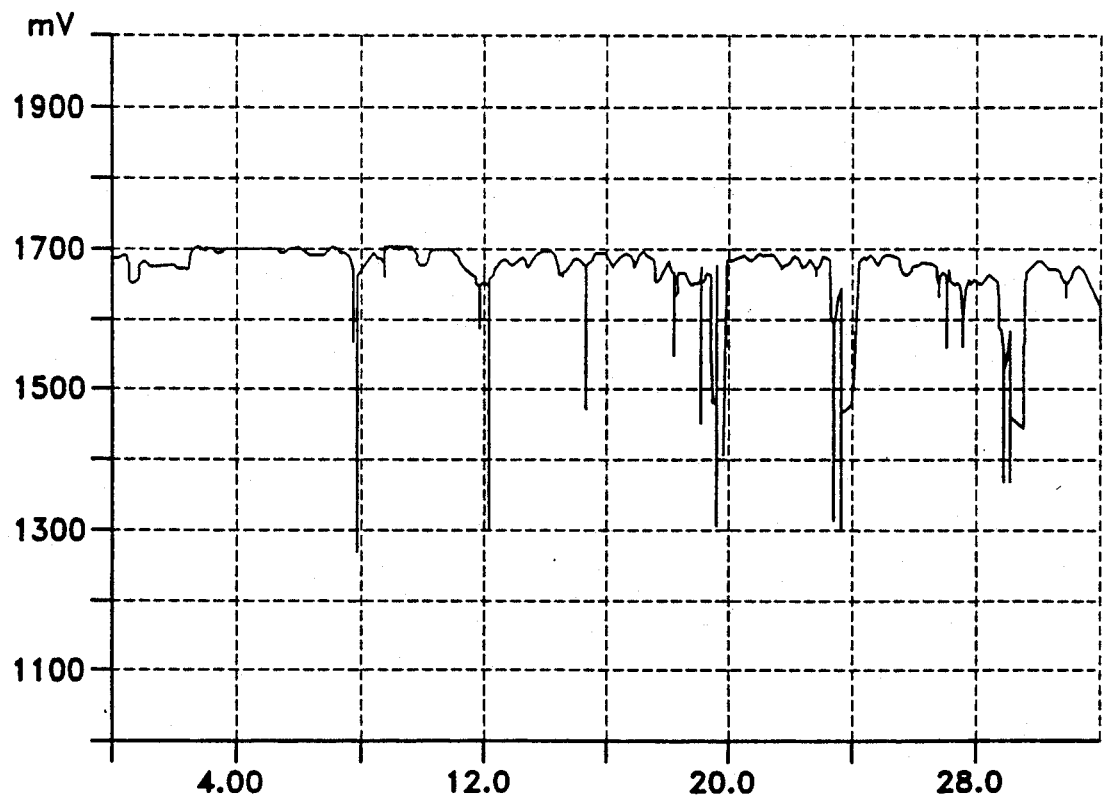

FIG. 4 shows the cell voltage versus time diagram for another cell on the same location, but this cell was connected to a device which in accordance with the present invention switched the cell on and off according to the diagram illustrated in FIG. 2. The off-voltage was set to a cell voltage of 1.1 V and the on-voltage to 1.3 V, corresponding to an off-cathode potential of $-0.4$ $V_{sce}$ and an on-cathode-potential of $-0.2$ $V_{sce}$.

In the cell shown in FIG. 4, no deterioration has been observed after 18 month discharge. The periods where the cell is disconnected are short, well below the limit given by the capacity of a small sealed lead/acid accumulator. In another location, with faster ocean currents, an identical cell was only rarely disconnected, and then only at high cell currents. In this case, and in later designs, the circuit that implement the function of FIG. 2 is located in the DC/DC converter to also switch off the converter. In these cells, the cell were switched off at a cathode potential of $-0.4$ $V_{sce}$ and on at $+0.2$ $V_{sce}$. As shown in FIG. 4, the cell voltage under load is close to 1.7 V, corresponding to a cathode potential of $+0.2$ $V_{sce}$. Unloaded, the cathode potential rises above $+0.3$ $V_{sce}$, corresponding to a cell voltage above 1.8 V. Under these conditions, the upper limit VH could have been raised from 1.3 V to 1.8 V with only marginally affecting the operation of the cell.

With cells having spinell coated stainless steel cathodes and magnesium alloy anodes, VL may be 1.1 V corresponding to a cathode potential of $-0.4$ $V_{sce}$ and VH may be 1.5 V corresponding to a cathode potential of 0.0 $V_{sce}$.

The use of this invention is not limited to one specific cell design, for instance to seawater cells which use catalyzed stainless steel wool as the cathode material, as in the examples referenced above. The invention gives the improvements to all prior art devices, which use oxygen dissolved in seawater as the active cathode material. Another example is a seawater cell based on radially oriented copper plates around a cylindrical magnesium anode, which have been tested successfully since November 1987.

It should also be realized that although the loop illustrated in FIG. 2 is beneficial as it allows for a dilution of alkaline seawater before the current is reapplied, the most important point is to switch off or reduce the cell load when the cathode potential drops significantly beyond its value under conditions of high electrolyte velocity through the cell. As the cathode potential depends on the electrocatalytic activity of the surface, not only the surface concentration of oxygen and surface pH, the optimum values for VL and VH must be determined experimentally for different cathode materials and shapes. Also, from purely thermodynamic reasoning, VH must be below a cell voltage corresponding to a cell with a reversible oxygen cathode (given by the Nernst potential for the reduction of oxygen) and VL should at least be so high that reduction of water can not take place at the cathode.

Typical values in cells with copper or copper alloy cathodes and magnesium alloy anodes is to switch off the cell at a cathode potential of $-0.6$ $V_{sce}$ and on at a potential of 0.3 $V_{sce}$. Corresponding to VH=1.2 V and VL=0.9 V.

Cells with carbon cathodes needs roughly 0.2 V higher values for VH and VL; reflecting the better electrocatalytic properties of carbon compared to copper seawater. With cells having carbon cathodes and magnesium alloy anodes, VL may be 1.1 V corresponding to a cathode potential of $-0.4$ $V_{sce}$ and VH may be 1.4 V corresponding to a cathode potential of $-0.1$ $V_{sce}$.

With cells having spinell coated stainless steel cathodes and aluminum alloy anodes, VL may be 0.8 V corresponding to a cathode potential of $-0.35$ $V_{sce}$ and VH may be 1.1 V corresponding to a cathode potential of 0.0 $V_{sce}$.

With cells having copper alloy cathodes and aluminum alloy anodes, VL may be 0.5 V corresponding to a cathode potential of $-0.6$ $V_{sce}$ and VH may be 0.8 V corresponding to a cathode potential of $-0.3$ $V_{sce}$.

We claim:

1. Method for preventing or greatly reducing formation of calcareous deposits on an inert electron conducting cathode in a primary cell which use natural seawater as electrolyte and dissolved oxygen in the seawater as oxidant, when the cell is connected to a load, comprising the steps:

monitoring the cell voltage, disconnecting or reducing the load if the cell voltage falls to a first level the cathode potential corresponding to said first level being above the Nernst potential for the reduction of water to hydrogen and below the Nernst potential for the reduction of oxygen in seawater, and reconnecting or increasing the load when the cell voltage rises to a second level which is larger than or equal to said first level.

2. Method according to claim 1, wherein the difference between the first and second voltage levels is greater than the voltage drop in the cell caused by the internal resistance of the cell.

3. Method according to claim 1, wherein a timing device is used for wholly or partly reconnecting the load.

4. Method according to claim 1, wherein
   a DC/DC converter is interconnected between the primary cell and the load, and
   the DC/DC converter is turned off and on in accordance with the same criteria as the load is disconnected/reconnected.

5. Method according to claim 1, wherein
   the cell has a spinell coated stainless steel cathode and a magnesium alloy anode,
   the first voltage level is 1.1 V corresponding to a cathode potential of $-0.4$ $V_{sce}$ and
   the second voltage level is 1.5 V corresponding to a cathode potential of 0.0 $V_{sce}$.

6. Method according to claim 1, wherein
   the cell has a copper or copper alloy cathode and a magnesium alloy anode,
   the first voltage level is 0.9 V corresponding to a cathode potential of $-0.6$ $V_{sce}$ and
   the second voltage level is 1.2 V corresponding to a cathode potential of $-0.3$ $V_{sce}$.

7. Method according to claim 1, wherein
   the cell has a carbon cathode and a magnesium alloy anode,
   the first voltage level is 1.1 V corresponding to a cathode potential of $-1.4$ $V_{sce}$ and
   the second voltage level is 1.5 V corresponding to a cathode potential of $-0.1$ $V_{sce}$.

8. Method according to claim 1, wherein
   the cell has a spinell coated stainless steel cathode and a aluminum alloy anode,
   the first voltage level is 0.8 V corresponding to a cathode potential of $-0.35$ $V_{sce}$ and
   the second voltage level is 1.1 corresponding to a cathode potential of 0.0 $V_{sce}$.

9. Method according to claim 1, wherein
   the cell has a copper alloy cathode and an aluminum alloy anode,
   the first voltage level is 0.5 V corresponding to a cathode potential of $-0.6$ $V_{sce}$ and
   the second voltage level is 0.8 V corresponding to a cathode potential of $-0.3$ $V_{sce}$.

10. Method according to claim 1, further comprising the steps of monitoring load and environmental conditions which are known to cause a low cathode potential which subsequently leads to calcareous deposits on the cathode, disconnecting or reducing the load in response to such conditions, and reconnecting or increasing in response to normal environmental and load conditions.

11. Method according to claim 10, wherein said conditions include the combination of low seawater velocity and high load.

* * * * *